Patented Aug. 29, 1944

2,357,181

UNITED STATES PATENT OFFICE 2,357,181

PREPARATION OF SULPHANILYLAMINO-GUANIDINES

Herman E. Faith, Stamford, and Philip S. Winnek, Riverside, Conn., assignors to American Cyanamid Company, New York, N. Y., a corporation of Maine No Drawing. Application July 31, 1942, Serial No. 453,101

12 Claims. (Cl. 260—397.7)

This invention relates to a new and improved process for the production of acylsulphanilylaminoguanidines and sulphanilylaminoguanidine.

Sulphanilylaminoguanidine shows promise of becoming an outstanding chemotherapeutic agent, and it is therefore extremely desirable that an improved process be developed for producing it on a commercial scale at a reasonable cost.

The carboxylic acylsulphanilylaminoguanidines and sulphanilylaminoguanidine, itself, are claimed as new chemical compounds in the copending application of Philip Stanley Winnek, Serial No. 415,430 filed August 17, 1941. While the method for producing these compounds disclosed in the application Serial No. 415,430 results in the production of satisfactory products, the yields are not particularly good and hence the cost of production on a commercial scale is not entirely satisfactory. In the former process it is required that a number of steps be carried out including the step of reacting p-acetylaminobenzenesulphonyl chloride with nitroguanidine to give p-acetylsulphanilylnitroguanidine, which is then subjected to a reduction step to give p-acetylsulphanilylaminoguanidine, followed by a hydrolysis step to give sulphanilylaminoguanidine.

According to the present invention we have found that acylsulphanilylaminoguanidine and sulphanilylaminoguanidine can be readily prepared by a shorter process involving only the reaction of an acylsulphanilyl cyanamide with a salt of hydrazine to give an acylsulphanilylaminoguanidine which is then hydrolyzed to sulphanilylaminoguanidine.

It is an advantage of the present invention that a novel process for producing sulphanilylaminoguanidine is provided which is more desirable for the commercial production of such compounds than previously known processes. It is also an advantage of the present invention that the process employs intermediates which are readily available in commercial quantities at a reasonable cost. It is a further advantage of the present invention that the reactions involved can be carried out in ordinary equipment and utilize techniques well suited for commercial production.

In carrying out the process of the present invention an acylsulphanilyl cyanimide, usually in the form of a salt, is reacted with a salt of hydrazine, such as hydrazine sulphate. This reaction proceeds smoothly simply by heating the reactants together. The temperatures employed range from about 100° to about 150° C. and the reaction is usually completed in thirty minutes. At the temperatures of reaction there is very little decomposition and the solid product; namely, an acylsulphanilylaminoguanidine, is readily recovered in a pure form by washing with aqueous hydrochloric acid. In this step of the process it is seen that the acyl group does not enter into the reaction and hence does not materially alter the course of the reaction. The acyl group may, therefore, be an acyl radical of a carboxylic acid including those such as acetyl, propionyl, benzoyl, nicotinyl, and the like. Since, however, the acyl group is frequently removed by hydrolysis in a later step, it is preferable to utilize the cheapest and most readily available acyl compounds; namely, the acetyl.

The acylsulphanilylaminoguanidine produced as described above can be readily converted into sulphanilylaminoguanidine by any one of several hydrolysis methods well known in the art. In general, we have found that good results are obtained by carrying the hydrolysis out in the presence of aqueous hydrochloric acid followed by neutralization with an alkali metal hydroxide or other suitable base to cause precipitation of the sulphanilylaminoguanidine.

The present invention is not concerned with any particular method of preparing the raw materials entering into the reaction, and any satisfactory method may be employed. For example, the acylsulphanilyl cyanamide salts can be prepared by reacting the corresponding acylsulphanilyl chloride with calcium cyanamide, sodium cyanamide, or the like; for example, acetylsulphanilyl chloride reacts readily with calcium cyanamide to give excellent yields of calcium acetylsulphanilyl cyanamide. From a commercial standpoint, therefore, it is usually desirable that calcium acetylsulphanilyl cyanamide be employed in our process since it utilizes as the starting materials the relatively cheap and abundantly available calcium cyanamide.

The invention will be described in greater detail in conjunction with the following specific examples, which, however, are merely illustrative of the preferred methods of preparing representative compounds of the class and are not intended to limit the scope of the invention. The parts are by weight except in the case of liquids which are expressed in corresponding parts by volume.

EXAMPLE 1

*Preparation of acetylsulphanilylaminoguanidine*

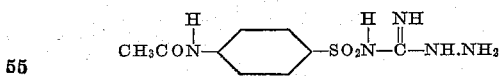

31.2 parts of hydrazine sulphate was added to 16.5 parts of 85% hydrazine hydrate solution with cooling. Into this reaction mixture was stirred 95 parts of calcium acetylsulphanilyl cyanamide,

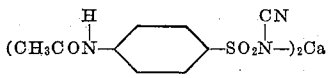

The resulting paste was placed in an oil bath which was heated to 120° C. The mixture became fluid at this point with its temperature remaining around 105°–110° C. for five minutes. The melt was stirred well and soon began to solidify. The temperature rose to 130° C. at which point the bath was removed. After the reactants stood at 130°–135° C. for five minutes the bath was reapplied and kept at 130° for twenty minutes. The hard cake was allowed to cool to room temperature and was then softened by covering with water. The material was filtered and stirred into 200 parts of 12% hydrochloric acid to dissolve the $CaSO_4$. The white product was filtered from the hydrochloric acid and washed with 12% hydrochloric acid until alkalization of the filtrate gave no calcium hydroxide. This acid cake was suspended in water and made alkaline with sodium hydroxide. The product, acetylsulphanilylaminoguanidine, was filtered off and washed with water.

In the above example the hydrazine sulphate may be replaced by any inorganic acid salt of hydrazine including the hydrazine hydrochlorides, hydrazine nitrates, and the like. Similarly, instead of calcium acetylsulphanilyl cyanamide we may use other metal salts including alkaline earth metal salts, generally; alkali metal salts, including sodium, potassium, and lithium; or various heavy metal salts of sulphanilylcyanamide. Preferably the calcium or sodium salts are employed because of their cheapness and ready availability.

Example 2

Sulphanilylaminoguanidine 100 parts of acetylsulphanilylaminoguanidine was suspended in 650 parts of 12% hydrochloric acid and the mixture heated to boiling. The solid material dissolved and heating was continued for ten minutes. The solution was cooled, treated with decolorizing charcoal and filtered. On neutralizing the filtrate with 40% sodium hydroxide the sulphanilylaminoguanidine separated as a white solid. It was purified by crystallization from hot water.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. The process of producing an acyl sulphanilylaminoguanidine which comprises reacting a salt of a carboxylic acid acylsulphanilyl cyanamide with a salt of hydrazine.
2. The process which comprises reacting a metal salt of a carboxylic acid acylsulphanilyl cyanamide with an inorganic acid salt of hydrazine to produce an acylsulphanilylaminoguanidine.
3. The process which comprises reacting a a metal salt of a carboxylic acid acylsulphanilyl cyanamide with an inorganic acid salt of hydrazine to produce an acylsulphanilylaminoguanidine and subsequently hydrolyzing to sulphanilylaminoguanidine.
4. The process which comprises reacting an alkaline earth metal salt of acetylsulphanilyl cyanamide with an inorganic acid salt of hydrazine to give acetylsulphanilylaminoguanidine.
5. The process which comprises reacting an alkaline earth metal salt of acetylsulphanilyl cyanamide with an inorganic acid salt of hydrazine to give acetylsulphanilylaminoguanidine and subsequently hydrolyzing to sulphanilylaminoguanidine.
6. The process which comprises reacting an alkali metal salt of acetylsulphanilyl cyanamide with an inorganic acid salt of hydrazine to give acetylsulphanilylaminoguanidine.
7. The process which comprises reacting an alkali metal salt of acetylsulphanilyl cyanamide with an inorganic acid salt of hydrazine to give acetylsulphanilylaminoguanidine and subsequently hydrolyzing to sulphanilylaminoguanidine.
8. The process which comprises heating calcium acetylsulphanilyl cyanamide with an inorganic acid salt of hydrazine to give acetylsulphanilylaminoguanidine.
9. The process which comprises heating calcium acetylsulphanilyl cyanamide with an inorganic acid salt of hydrazine to give acetylsulphanilylaminoguanidine and subsequently removing the acetyl group by hydrolysis to give sulphanilylaminoguanidine.
10. The process which comprises heating calcium acetylsulphanilyl cyanamide with hydrazine sulphate to give acetylsulphanilylaminoguanidine.
11. The process which comprises heating calcium acetylsulphanilyl cyanamide with hydrazine sulphate to give acetylsulphanilylaminoguanidine and subsequently removing the acetyl group by hydrolysis to give sulphanilylaminoguanidine.
12. The process which comprises heating calcium acetylsulphanilyl cyanamide with a mixture of hydrazine sulphate and hydrazine hydrate to give acetylsulphanilylaminoguanidine.

HERMAN E. FAITH.
PHILIP S. WINNEK.